(12) United States Patent
Wahlig et al.

(10) Patent No.: US 8,041,915 B1
(45) Date of Patent: Oct. 18, 2011

(54) FASTER MEMORY ACCESS IN NON-UNIFIED MEMORY ACCESS SYSTEMS

(75) Inventors: Elsie D. Wahlig, Cedar Park, TX (US); Marlin L. McGuire, Austin, TX (US); Paul Devriendt, Austin, TX (US)

(73) Assignee: GLOBALFOUNDRIES Inc., Grand Cayman (KY)

( * ) Notice: Subject to any disclaimer, the term of this patent is extended or adjusted under 35 U.S.C. 154(b) by 1620 days.

(21) Appl. No.: 10/459,344

(22) Filed: Jun. 11, 2003

(51) Int. Cl.
*G06F 12/00* (2006.01)

(52) U.S. Cl. ........................ 711/170; 345/543

(58) Field of Classification Search .................. None
See application file for complete search history.

(56) References Cited

U.S. PATENT DOCUMENTS

| | | | |
|---|---|---|---|
| 5,319,751 A * | 6/1994 | Garney | 711/115 |
| 5,386,466 A | 1/1995 | Bales et al. | |
| 5,506,847 A | 4/1996 | Shobatake | |
| 5,671,413 A | 9/1997 | Shipman et al. | |
| 5,859,975 A | 1/1999 | Brewer et al. | |
| 5,884,027 A | 3/1999 | Garbus et al. | |
| 5,913,045 A | 6/1999 | Gillespie et al. | |
| 5,938,765 A | 8/1999 | Dove et al. | |
| 5,970,496 A | 10/1999 | Katzenberger | |
| 5,987,521 A | 11/1999 | Arrowood et al. | |
| 6,023,733 A | 2/2000 | Periasamy et al. | |
| 6,049,524 A | 4/2000 | Fukushima et al. | |
| 6,108,739 A | 8/2000 | James et al. | |
| 6,158,000 A | 12/2000 | Collins | |
| 6,167,492 A | 12/2000 | Keller et al. | |
| 6,195,749 B1 | 2/2001 | Gulick | |
| 6,211,891 B1 | 4/2001 | Wahlig | |
| 6,233,641 B1 | 5/2001 | Graham et al. | |
| 6,269,459 B1 | 7/2001 | Wahlig | |
| 6,327,669 B1 | 12/2001 | Croslin | |
| 6,370,633 B2 * | 4/2002 | Sethi | 711/206 |
| 6,434,656 B1 * | 8/2002 | Downer et al. | 710/316 |
| 6,462,745 B1 * | 10/2002 | Behrbaum et al. | 345/543 |
| 6,496,510 B1 | 12/2002 | Tsukakoshi et al. | |
| 6,560,720 B1 | 5/2003 | Chirashnya et al. | |
| 6,633,964 B2 | 10/2003 | Zimmer et al. | |
| 6,701,341 B1 | 3/2004 | Wu et al. | |
| 6,701,421 B1 * | 3/2004 | Elnozahy et al. | 711/170 |
| 6,741,561 B1 | 5/2004 | Lee | |

(Continued)

FOREIGN PATENT DOCUMENTS

WO   WO 2004/095302   11/2004

OTHER PUBLICATIONS

Intel Corporation, "AGP V3.0 Interface Specification," AGP Accelerated Graphics Port, Revision: 1.0, Sep. 2002, pp. 1-143.

(Continued)

*Primary Examiner* — Kaushikkumar Patel
(74) *Attorney, Agent, or Firm* — Zagorin O'Brien Graham LLP

(57) ABSTRACT

A generic NUMA-compliant memory selection technique is provided to enable a device capable of accessing memory anywhere in a system to select a near (potentially the nearest) memory for use with the device. For example, an AGP controller can access system memory anywhere within a multi-processing node system, but will operate more efficiently, and interfere less with other data transactions, if it locates the closest memory, determines the memory addresses corresponding to the closest memory, and locks (or otherwise allocates) memory addresses for AGP functionality within the range of determined addresses in the near memory.

25 Claims, 2 Drawing Sheets

U.S. PATENT DOCUMENTS

| | | |
|---|---|---|
| 6,760,838 B2 | 7/2004 | Owen et al. |
| 6,791,939 B1 | 9/2004 | Steele et al. |
| 6,826,148 B1 | 11/2004 | Lee |
| 6,865,157 B1 | 3/2005 | Scott et al. |
| 6,883,108 B2 | 4/2005 | Lee et al. |
| 6,918,103 B2 | 7/2005 | Brawn et al. |
| 6,988,149 B2 | 1/2006 | Odenwald |
| 6,996,629 B1 | 2/2006 | Odenwald |
| 7,007,189 B2 | 2/2006 | Lee et al. |
| 7,027,413 B2 | 4/2006 | Lee et al. |
| 7,028,099 B2 | 4/2006 | Troxel et al. |
| 7,051,334 B1 | 5/2006 | Porter et al. |
| 7,072,976 B2 | 7/2006 | Lee |
| 2002/0087652 A1* | 7/2002 | Davis et al. ............ 709/213 |
| 2002/0103995 A1 | 8/2002 | Owen et al. |
| 2003/0225909 A1* | 12/2003 | Glasco et al. ............ 709/245 |
| 2004/0122973 A1 | 6/2004 | Keck et al. |
| 2004/0139287 A1* | 7/2004 | Foster et al. ............ 711/153 |
| 2004/0193706 A1 | 9/2004 | Willoughby et al. |
| 2004/0205304 A1* | 10/2004 | McKenney et al. ...... 711/148 |

OTHER PUBLICATIONS

"HyperTransport™ Technology I/O Link," Advanced Micro Devices, Inc., Jul. 20, 2001, pp. 1-25.

"HyperTransport™ Technology: Simplifying System Design," Advanced Micro Devices, Inc., Oct. 2002, pp. 1-22.

* cited by examiner

FASTER MEMORY ACCESS IN NON-UNIFIED MEMORY ACCESS SYSTEMS

BACKGROUND

1. Field

The present invention relates to memory accessing in information processing systems, and, more particularly, to improved memory access in multiple processor systems.

2. Description of the Related Art

Accelerated Graphics Port (AGP) is an interface specification that enables 3-D graphics to display quickly on ordinary personal computers. AGP is designed to convey 3-D images (for example, from Web sites or CD-ROMs) much more quickly and smoothly than is otherwise normally possible on any computer other than an expensive graphics workstation. It is especially useful in conjunction with gaming, three-dimensional (3D) video, and sophisticated scientific/engineering graphics programs.

An AGP graphics processor card typically includes its own video memory, but such memory is expensive, and is typically used to provide a frame buffer to draw the display. Because such memory may be insufficient to store all video data, the AGP interface uses a computer system's random access memory (RAM) to support functions such as texture mapping, z-buffering, and alpha blending typically performed for 3-D image display. Such access of system memory is similar to that used in unified memory architecture (UMA) graphics systems, which typically have no video memory on the graphics card. The AGP main memory use is dynamic, meaning that when not being used for accelerated graphics, main memory is restored for use by the operating system or by other applications.

NUMA (non-unified memory access) is a method of configuring a set of microprocessors in a multiprocessing system so that the microprocessors can share memory locally, improving performance and the ability of the system to be expanded. NUMA is commonly used in symmetric multiprocessing (SMP) systems. SMP and NUMA systems are typically used, for example, for applications in which it is advantageous to parcel out processing tasks to a number of processors that collectively work on a common database. Typically, all processors that are part of an SMP processor complex can access all resources of that complex, such as memory, or i/o devices. Software can run on any processor without regard to device accessibility. A typical SMP system would have one memory controller and that single memory controller manages all of the DRAM.

An exemplary NUMA architecture may include four microprocessors interconnected on a local bus (for example, a Peripheral Component Interconnect (PCI) bus or a Hyper-Transport protocol bus) to a shared memory (e.g., an "L3 cache") on a single motherboard or card. This unit can be added to similar units to form a symmetric multiprocessing system in which a common SMP bus interconnects all of the clusters. Such a system can contain any number of microprocessors, often from 16 to 256 microprocessors, for example. To an application program running in an SMP system, all the individual processor memories look like a single memory.

In a NUMA SMP system, some devices such as an AGP graphics controller can use any memory within the system. If the AGP graphics controller uses memory addresses which correspond to a physical device located farther away from the AGP controller on the NUMA interconnect subsystem rather than closer to the AGP controller, greater latency of memory accesses may be introduced, thereby potentially detrimentally affecting the overall performance of the NUMA SMP system. Thus, a technique is needed to effectively and efficiently allocate memory accessible by devices in multiprocessor systems, for example, to reduce memory access latency.

BRIEF DESCRIPTION OF EMBODIMENTS

The present invention relates to memory accessing in information processing systems, and, more particularly, to improved memory access in multiple processor systems. A generic NUMA-compliant memory selection technique is provided to enable a device capable of accessing memory anywhere in a system to select a near (potentially the nearest) memory for use with the device. For example, an AGP controller can access system memory anywhere within a multiprocessing node system, but will operate more efficiently, and interfere less with other data transactions, if it locates the closest memory, determines the memory addresses corresponding to the closest memory, and locks (or otherwise allocates) memory addresses for AGP functionality within the range of determined addresses in the near memory. Also for example, buffers for a small computer system interface (SCSI) controller may be selected in a near memory in a similar manner by a SCSI controller or other apparatus. Other embodiments may include near memory selection to some advantage In one embodiment, a method of near memory allocation is provided for a device in an information processing system including a plurality of processing nodes and a plurality of memories associated with the processing nodes. A processing node near to the device is determined. A memory associated with the near processing node is determined. A portion of the near memory to the device is allocated. In a further embodiment, the near processing node is determined by accessing a routing table associated with each processing node, processing information from each routing table to determine which processing node is nearer to the device, and selecting the processing node which is nearer to the device as the near processing node. In another further embodiment, the near memory associated with the nearest processing node is determined by accessing a memory routing table associated with the near processing node, and selecting from the memory routing table an address range corresponding to memory locations within a memory, the memory including the memory locations being the near memory. In another further embodiment, the portion of the near memory to the device is allocated by accessing the memory routing table, and locking the selected address range for use by the device.

In another embodiment, an apparatus includes near memory selector code encoded on at least one computer readable medium. The near memory selector code includes instructions for determining a near processing node which corresponds to a data path between a device and the near processing node which is shorter than a data path between the device and another processing node. The near memory selector code also includes instructions for allocating memory locations in a near memory which is locally coupled to the near processing node. In a further embodiment, the apparatus includes various processing nodes and memories. Each of the plurality of memories is locally coupled to one of the plurality of processing nodes and remotely accessible by others of the processing nodes. In yet a further embodiment, the apparatus includes a device coupled to at least one of the processing nodes, and the near memory selector code is comprised within a device driver corresponding to the device. In yet a further embodiment, the device is one of an accelerated graphics port (AGP) controller, a SCSI device, or an Ethernet device.

In another embodiment, a near memory allocation computer program product is provided for configuring memory in an information processing system including a plurality of processing nodes, a plurality of memories associated with the processing nodes, and a device. The computer program product includes instructions for determining a near processing node to the device, instructions for determining a near memory associated with the near processing node, and instructions for allocating a portion of the near memory to the device. In a further embodiment, the computer program product is a device driver.

The foregoing is a summary and thus contains, by necessity, simplifications, generalizations and omissions of detail. Consequently, those skilled in the art will appreciate that the foregoing summary is illustrative only and that it is not intended to be in any way limiting of the invention. Other aspects, inventive features, and advantages of the present invention, as defined solely by the claims, may be apparent from the detailed description set forth below.

BRIEF DESCRIPTION OF THE DRAWINGS

The present invention may be better understood, and its numerous objects, features, and advantages made apparent to those skilled in the art, by referencing the accompanying drawings. The use of the same reference symbols in different drawings indicates similar or identical items.

DETAILED DESCRIPTION OF EMBODIMENT(S)

The following discussion is intended to provide a detailed description of at least one example of the invention and should not be taken to be limiting of the invention itself. Rather, any number of variations may fall within the scope of the invention which is properly defined in the claims following this description.

Figure 1:
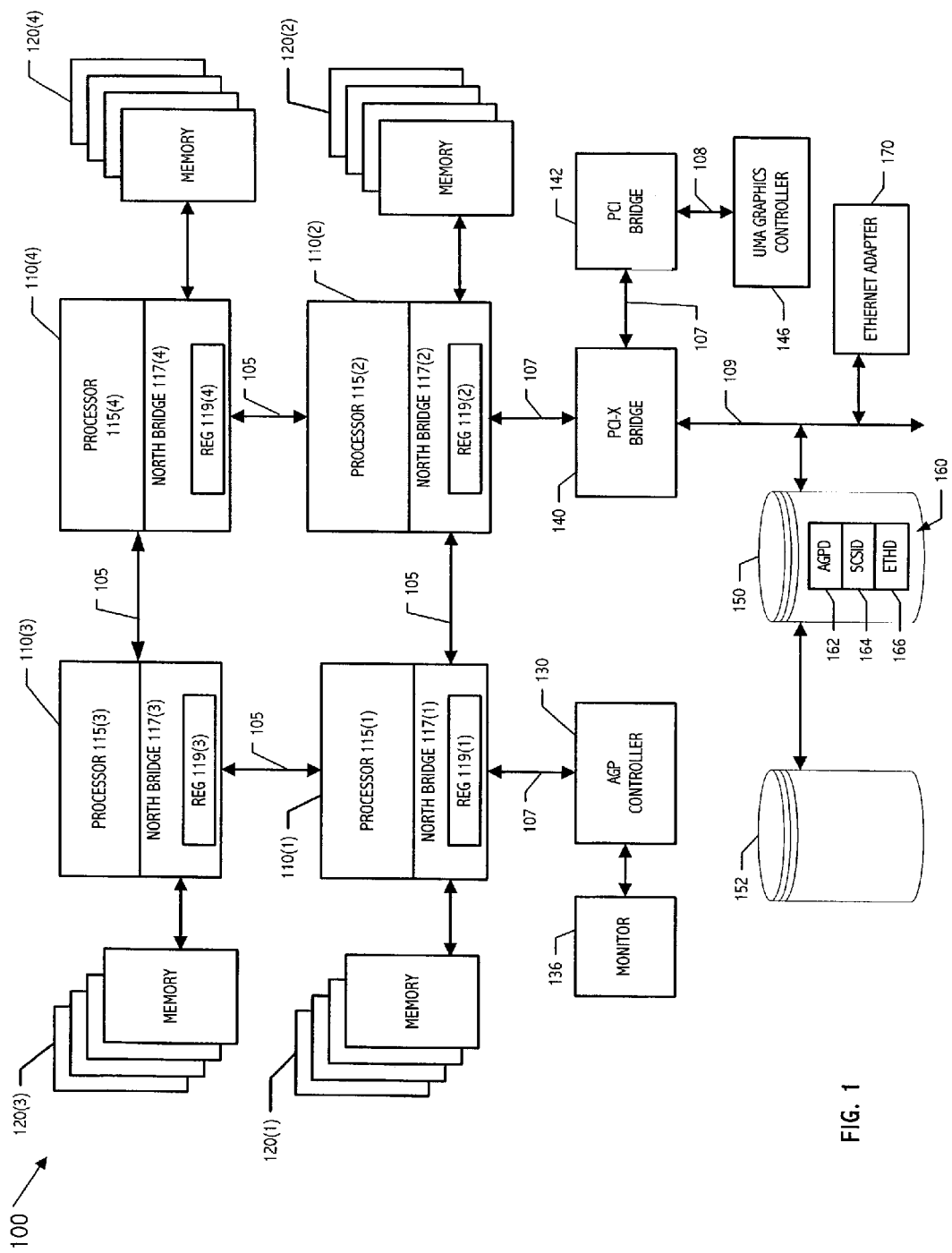
FIG. 1 is a block diagram of a near-memory configurable multi-device information processing system in accordance with one embodiment of the invention.

FIG. 1 shows an information processing system 100 which is a multiprocessor system with multiple processing nodes 110(1)-(4) that communicate with each other via links 105. In the illustrated embodiment, each processing node 110 is exemplary of any appropriate processing entity determined by the tasks for which system 100 is to be used. As shown, each processing node 110 is a microprocessor which includes a processor core 115 and a north bridge 117 in a single integrated circuit. In alternative embodiments, processor core 115 may be an integrated circuit separate from, but coupled to, a north bridge integrated circuit. Other embodiments may have other configurations for processing nodes 110.

Although four processing nodes are shown for purposes of illustration, one skilled in the art will appreciate that system 100 can include any number of processing nodes. Also, links 105 can be any type of link. In the present example, links 105 are dual point-to-point links according to, for example, a split-transaction bus protocol such as the HyperTransport (HT) protocol. Links 105 can include a downstream data flow and an upstream data flow. Link signals typically include link traffic such as clock, control, command, address and data information and link sideband signals that qualify and synchronize the traffic flowing between devices.

System 100 also includes multiple memories 120(1-4), each of which is coupled to provide a local memory for one of microprocessors 110. Specifically, microprocessor 110(1) is locally associated with memory 120(1), microprocessor 110(2) is locally associated with memory 120(2), microprocessor 110(3) is locally associated with memory 120(3) and microprocessor 110(4) is locally associated with memory 120(4). Each of memories 120 is remotely accessible by non-local processors. For example, memory 120(1) is remotely accessible to microprocessors 110(2), 110(3) and 110(4), memory 120(2) is remotely accessible to microprocessors 110(1), 110(3) and 110(4), memory 120(3) is remotely accessible to microprocessors 110(1), 110(2) and 110(4), and memory 120(4) is remotely accessible to microprocessors 110(1), 110(2) and 110(3).

Each one of north bridges 117(1)-(4) communicates with respective ones of a memory array 120(1)-(4). In the present example, the processing nodes 110 (1)-(4) and corresponding memory arrays 120 (1)-(4) are in a "coherent" portion of system 100 where memory transactions are coherent. Each of the processing nodes 110 is coupled to another of the processing nodes 110 via coherent hyper transport (CHT) links 105. Scalable coherence interface technology may be used to coordinate cache or memory coherence or consistency across multiple processing nodes and/or across multiple clusters of processing nodes. One or more I/O devices (e.g., devices 130-170, discussed below) can be coupled to processors 110. In the present example, such devices 130-170 are in a "noncoherent" portion of the system. System 100 includes multiple memory controllers (e.g., in each north bridge) which can result in accesses to memories 120 from different processors taking a different times. Thus, allocating memory to closer devices as described herein speeds up memory access times.

As shown, system 100 is structured according to a nonunified memory architecture (NUMA). In this embodiment, each microprocessor has its own local memory. Each microprocessor 110 includes (or is attached to) its own north bridge to control its own block of memory. In the illustrated embodiment, system 100 includes 4 microprocessors with 4 north bridges controlling 4 blocks of memory, where a block of memory is 1 or more sticks of dynamic random access memory (DRAM), for example. Any number of microprocessors, and therefore north bridges and memory blocks, may be used in such an architecture. Each processor can access its own local block of memory, or send a message to another processor asking for a memory access to be done on its behalf.

Other embodiments of system 100 may be more complex or simpler than shown. For example, additional or fewer processing nodes 110 can make up the coherent portion of the system. Additionally, although processing nodes 110 are illustrated in a "ladder architecture," processing nodes 110 can be interconnected in a variety of ways (e.g., star, mesh and the like) and can have more complex couplings.

As noted, system 100 also includes various devices 130-170 coupled to microprocessors 110. For example, AGP devices, SCSI devices, PCI-X and PCI devices, and Ethernet devices are coupled to microprocessors 110(1), 110(2). Specifically, as shown, microprocessor 110(1) is coupled to AGP controller 130 via a non-coherent hyper transport (NCHT) link 107. AGP controller 130 provides a bridge for AGP video control of monitor 136. Also, microprocessor 110(2) is coupled to PCI-X bridge 140 via an NCHT link 107. PCI-X bridge 140 is coupled to Ethernet adapter 170 via PCI-X bus 109. PCI-X bridge 140 is also coupled to SCSI I/O 150 via PCI-X bus 109. I/O 150 is coupled to I/O 152. PCI-X bridge 140 is also coupled to PCI bridge 142 via an NCHT link 107. PCI bridge 142 is coupled to PCI devices such as a legacy UMA graphics controller 146.

System 100 also includes certain near memory allocation (NMA) applications 160 for allocating memory nearer to or nearest certain corresponding devices. The following exemplary NMA drivers 160 are illustrated in FIG. 1: AGP NMA driver AGPD 162, SCSI NMA driver SCSID 164, or Ethernet driver ETHD 166. As shown, near memory applications 160 are stored on I/O 150, but may be stored in any appropriate location within system 100. Near memory applications 160 are discussed in further detail below.

One or more of microprocessors 110 includes one or more registers 119 which are accessible by a near memory allocation application 160. In the presently discussed embodiment, registers 119 are registers assigned to store information regarding the allocation of memory to devices in system 100. For example, a memory address remapping table may be allocated using registers 119. Such memory allocation is discussed in further detail below. Registers 119 are representative of place holders in the register space of the corresponding microprocessor, and may, for example, be implemented as microprocessor status registers or portions thereof. Although they are shown as being in north bridges 117, registers 119 may be located in processor cores 115 or both of processor cores 110 and north bridges 117. Additional registers may be included in other devices within system 100 such as chipset bridge devices (e.g., an AGP controller, a host-to-PCI bridge, etc.). Transfers of requests, responses and broadcast messages within system 100 are directed by multiple configuration routing tables (represented in FIG. 1 by registers 119) located in each processing node (e.g., in a memory controller in each north bridge or other appropriate storage location). The routing tables in each node provide the configuration of the system architecture (e.g., system topology or the like).

As shown, I/O 150 is a SCSI persistent storage device, but I/O 150 is representative of various processing interface devices such as user input/output devices (e.g., keyboard, mouse, monitor), persistent storage (e.g., magnetic hard drive(s) or other non-volatile storage), data transmission devices, and various other devices which may provide control and data information to processing nodes 110 of system 100. As such, I/O 150 is representative of any type of computer readable medium.

In the presently discussed embodiment, I/O 150 includes several computer program products to be loaded into memory of system 100 for execution by one or more processing nodes to enable near memory allocation in system 100 (described in further detail herein). In various embodiments, the computer program product may take any of a variety of forms including incorporation into an operating system, a basic input/output system (BIOS), a driver (e.g., AGP driver 162) or any other appropriate form.

An NMA driver 160 may be, for example, a device driver such as AGP chipset driver 162 (or a portion thereof) for selecting memory close to a graphics controller device. For example, an AGP NMA driver 162 corresponding to graphics controller 130 is stored in I/O 150. Upon being loaded into memory and executed, AGPD 162 can then identify memory 120(1) as the nearest memory (or at least having a data path to AGP controller 130 which is shorter than some other memories 120). AGPD can then allocate memory locations in memory 120(1) for monitor refresh, texture mapping, z-buffering, alpha blending and any other functions. Memory latency is thereby reduced since AGP controller 130 need not access more remotely located memories 120(2)-120(4), thereby incurring greater memory latency.

ETHD 166 may provide NMA capability to select memory close to a corresponding or otherwise identified Ethernet controller/device such as one or more of Gigabit Ethernet adapter 170. Each Ethernet adapter in the system can then use the closest memory to that adapter for network buffers. SCSID 164 may provide NMA capability to select memory close to a corresponding or otherwise identified SCSI controller/device. Even a UMA graphics driver may use near memory allocation. Other embodiments may include other types of NMA drivers 160 alternatively or in addition to the above exemplary NMA drivers. In this way, non-processor devices capable of accessing memory may be coupled within system 100 and system 100 may be configured to decrease memory access times by allocating near memory to the devices. Such memory access are faster due to lower latency because data is retrieved or stored more quickly since it has to cross fewer links, and due to a resulting reduction of unnecessary system load on the unused additional links (e.g., another data transaction could be delayed on the now unused links by the now unnecessary and now localized device traffic.

Figure 2:
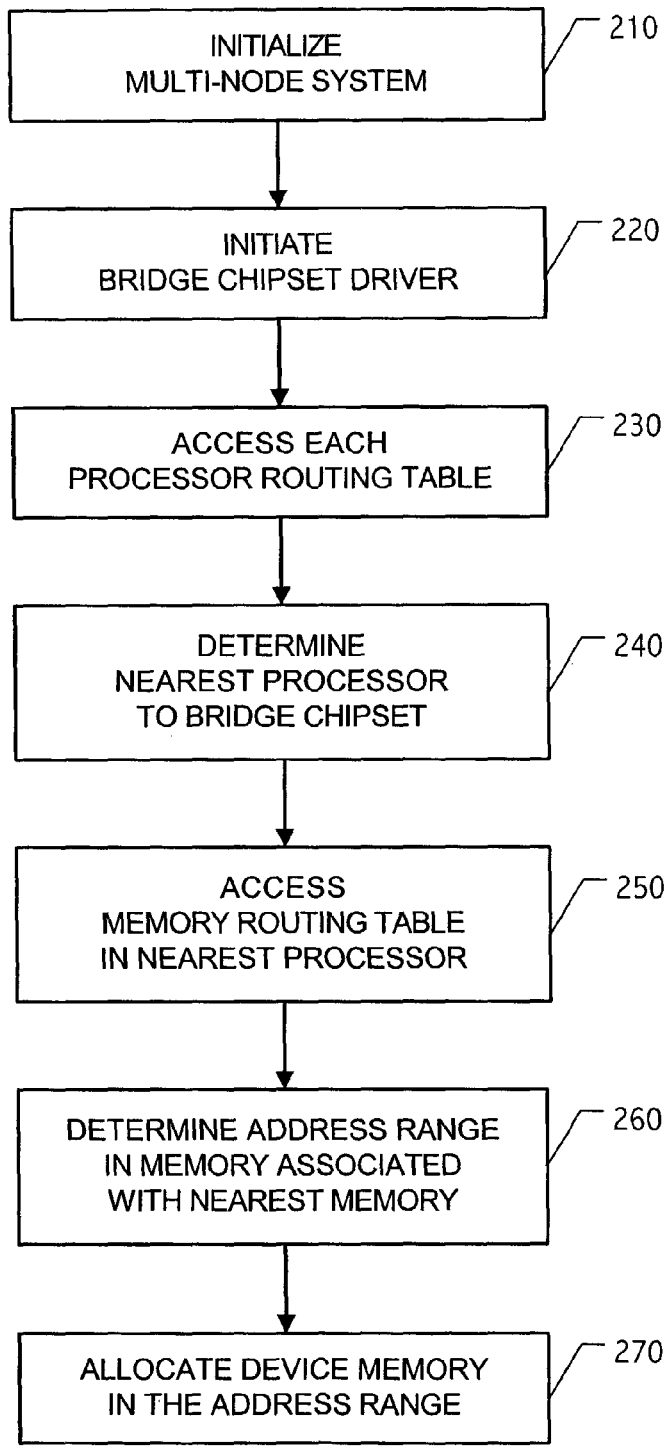
FIG. 2 is a flow chart showing an operational flow for near memory allocation in a multi-device information processing system.

FIG. 2 is a flow chart showing an exemplary operational flow executable within the system of FIG. 1. More specifically, FIG. 2 shows a flow chart of one embodiment of an operational flow for near memory allocation in an information processing system operating under partial control of a near memory allocation capable application such as a bridge chipset driver for one of a variety of functions (AGP control, SCSI, Ethernet, etc.).

NUMA system 100 is initialized during initialization operation 210. Next the bridge chipset driver is initialized during initiate driver operation 220. For example, NMA driver 162 is loaded in to memory and executed by microprocessor(s) of NUMA system 100. In the discussed embodiment, NMA driver 162 is for selecting memory close to a graphics controller device for monitoring refresh, texture mapping, z-buffering, alpha blending and any other functions. Such an AGP driver could include various functionality including traditional initialization and runtime driver routines. When the driver is loaded at boot time, target chipset physical device objects are created corresponding to each device which will perform AGP functionality, and device extensions are initialized. Various dispatch routines may be executed for specification of AGP resources and interfaces, and various I/O control and system control functionality.

System 100 is now ready to locate the nearest memory to the chipset in question for allocation of that memory to the chipset. Each processor is associated with a processor routing table. During table access operation 230, each processor routing table is accessed to determine the location of the processor in relation to the bridge chip set. The nearest processor to the bridge chip set is identified during determine nearest processor operation 240.

Once the AGP NMA driver is loaded, any chipset specific data structures can be initialized (e.g., as described below), and the appropriate devices within the system are programmed for optimal use of their combined capabilities for AGP functionality (e.g., by determining data rate, and enabling side band addressing, fast-writing and 4 GB addressing if supported by the devices).

The memory routing table associated with the nearest processor to the AGP controller is accessed during access memory routing table operation 250. If the first time, a graphics address remapping table is initialized on the memory associated with the nearest processor to the AGP controller.

Next, AGP NMA driver 162 determines an address range in the memory associated with the nearest processor during determine address range operation 260. For example, NMA driver 162 accesses the graphics address remapping table and identifies sufficient contiguous page table entries to satisfy AGP memory needs.

Once the memory range has been determined, device memory in the address range is allocated during allocate device memory operation 270. For example, AGP NMA driver 162 reserves the page table entries identified during operation 260, and the starting page table entry and memory base address are recorded to facilitate future access of the reserved memory. In this way, the nearest available memory may be identified and reserved in order to reduce memory access latency.

The above description is intended to describe at least one embodiment of the invention. The above description is not intended to define the scope of the invention. Rather, the scope of the invention is defined in the claims below. Thus, other embodiments of the invention include other variations, modifications, additions, and/or improvements to the above description. As noted above, the foregoing description is provided in the context of an AGP driver of system 100. One exemplary AGP enabled system is described in U.S. Pat. No. 6,211,891, entitled "Method for Enabling and Configuring and AGP Chipset Cache Using a Registry," naming Elsie D. Wahlig as inventor, filed Aug. 25, 1998 and issued on Apr. 3, 2001, which patent is incorporated herein by reference in its entirety. Other embodiments may include other types of controllers, bridges, chipsets and memory types, and corresponding NMA drivers, applications, features, etc.

The foregoing components and devices (shown, e.g. in FIG. 1) are used herein as examples for sake of conceptual clarity. Consequently, as used herein these specific exemplars are intended to be representative of their more general classes. Furthermore, in general, the use of any specific exemplar herein is also intended to be representative of its class and the non-inclusion of any specific devices in any exemplary lists herein should not be taken as indicating that limitation is desired.

Those skilled in the art will recognize that boundaries between the functionality of the above described operations are merely illustrative as well. The functionality of multiple operations may be combined into a single operation, and/or the functionality of a single operation may be distributed in additional operations. Moreover, alternative embodiments may include multiple instances of a particular operation, and the order of operations may be altered in various other embodiments.

In one embodiment, system 100 is a computer system such as a server, workstation or personal computer system. Other embodiments may include different types of computer systems. Computer systems are information handling systems which can be designed to give independent computing power to one or more users. Computer systems may be found in many forms including but not limited to mainframes, minicomputers, servers, workstations, personal computers, notepads, personal digital assistants, various wireless devices and embedded systems. A typical computer system includes at least one processing unit, associated memory and a number of input/output (I/O) devices.

A computer system processes information according to a program and produces resultant output information via I/O devices. A program is a list of instructions such as a particular application program and/or an operating system. A computer program is typically stored internally on a computer readable storage medium or transmitted to the computer system via a computer readable transmission medium. A computer process typically includes an executing (running) program or portion of a program, current program values and state information, and the resources used by the operating system to manage the execution of the process. A parent process may spawn other, child processes to help perform the overall functionality of the parent process. Because the parent process specifically spawns the child processes to perform a portion of the overall functionality of the parent process, the functions performed by child processes (and grandchild processes, etc.) may sometimes be described as being performed by the parent process.

The operations discussed herein (e.g., with regard to FIG. 2), unless otherwise specified, may consist of steps carried out by system users, hardware modules and/or software modules. Thus, the operations referred to herein may correspond to modules or portions of modules (e.g., software, firmware or hardware modules). The software modules discussed herein may include script, batch or other executable files, or combinations and/or portions of such files. The software modules may include a computer program or subroutines thereof encoded in computer-readable media. The functionality of operations referred to herein may correspond to the functionality of modules or portions of modules in various embodiments.

Additionally, those skilled in the art will recognize that the boundaries between modules are merely illustrative and alternative embodiments may merge modules or impose an alternative decomposition of functionality of modules. For example, the modules discussed herein may be decomposed into submodules to be executed as multiple computer processes. Moreover, alternative embodiments may combine multiple instances of a particular module or submodule.

Each of the blocks/operations of FIG. 2, or portions thereof, may be executed by a module (e.g., a software, hardware or firmware module) or a portion of a module or a computer system user. Thus, the above described method, the operations thereof and modules therefor may be executed on a computer system configured to execute the operations of the method and/or may be executed from computer-readable media. The method may be embodied in a machine-readable and/or computer-readable medium for configuring a computer system to execute the method. Thus, the software modules may be stored within and/or transmitted to a computer system memory to configure the computer system to perform the functions of the module.

Software modules described as being executed herein may be received by the executing system, for example, from one or more computer readable media. The computer readable media may be permanently, removably or remotely coupled to the executing system. The computer readable media may include, for example and without limitation, any number of the following: magnetic storage media including disk and tape storage media; optical storage media such as compact disk media (e.g., CD-ROM, CD-R, etc.) and digital video disk storage media; nonvolatile memory storage media including semiconductor-based memory units such as FLASH memory, EEPROM, EPROM, ROM; ferromagnetic digital memories; spintronic memories; volatile storage media including registers, buffers or memories, main memory, RAM, etc.; and data transmission media including computer networks, point-to-point telecommunication equipment, and carrier wave transmission media, just to name a few. Other new and various types of computer-readable media may be used to store and/or transmit the software modules discussed herein. As used herein, computer readable storage media (or medium) includes only tangible computer readable storage media (or medium) such as: magnetic storage media, including disk and tape storage media; optical storage media, including compact disk media (e.g., CD-ROM, CD-R, etc.) and digital video disk storage media; nonvolatile memory storage media, including semiconductor-based memory units including FLASH memory, EEPROM, EPROM, ROM; ferromagnetic digital memories; spintronic memories; volatile storage media including registers, buffers or memories, main memory, RAM, etc.

It is to be understood that the architectures depicted herein are merely exemplary, and that in fact many other architectures can be implemented which achieve the same functionality. In an abstract, but still definite sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality.

Because the above detailed description is exemplary, when "one embodiment" is described, it is an exemplary embodiment. Accordingly, the use of the word "one" in this context is not intended to indicate that one and only one embodiment may have a described feature. Rather, many other embodiments may, and often do, have the described feature of the exemplary "one embodiment." Thus, as used above, when the invention is described in the context of one embodiment, that one embodiment is one of many possible embodiments of the invention.

Notwithstanding the above caveat regarding the use of the words "one embodiment" in the detailed description, it will be understood by those within the art that if a specific number of an introduced claim element is intended in the below claims, such an intent will be explicitly recited in the claim, and in the absence of such recitation no such limitation is present or intended. For example, in the claims below, when a claim element is described as having "one" feature, it is intended that the element be limited to one and only one of the feature described. Furthermore, when a claim element is described in the claims below as including or comprising "a" feature, it is not intended that the element be limited to one and only one of the feature described. Rather, for example, the claim including "a" feature reads upon an apparatus or method including one or more of the feature in question. That is, because the apparatus or method in question includes a feature, the claim reads on the apparatus or method regardless of whether the apparatus or method includes another such similar feature. This use of the word "a" as a nonlimiting, introductory article to a feature of a claim is adopted herein by Applicants as being identical to the interpretation adopted by many courts in the past, notwithstanding any anomalous or precedential case law to the contrary that may be found. Similarly, when a claim element is described in the claims below as including or comprising an aforementioned feature (e.g., "the" feature), it is intended that the element not be limited to one and only one of the feature described merely by the incidental use of the definite article.

Furthermore, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles.

While particular embodiments of the present invention have been shown and described, it will be obvious to those skilled in the art that, based upon the teachings herein, various modifications, alternative constructions, and equivalents may be used without departing from the invention claimed herein. Consequently, the appended claims encompass within their scope all such changes, modifications, etc. as are within the true spirit and scope of the invention. Furthermore, it is to be understood that the invention is solely defined by the appended claims. The above description is not intended to present an exhaustive list of embodiments of the invention. Unless expressly stated otherwise, each example presented herein is a nonlimiting or nonexclusive example, whether or not the terms nonlimiting, nonexclusive or similar terms are contemporaneously expressed with each example. Although an attempt has been made to outline some exemplary embodiments and exemplary variations thereto, other embodiments and/or variations are within the scope of the invention as defined in the claims below.

What is claimed is:

1. A method of near memory allocation for a device in an information processing system including a plurality of processing nodes and a plurality of memories respectively associated with the processing nodes, the method comprising:
   determining a near processing node to the device;
   determining a near memory associated with the near processing node;
   allocating a portion of the near memory to the device;
   wherein the determining the near processing node comprises:
   accessing respective routing tables associated with each of the processing nodes and located in respective processing nodes;
   processing information from the routing tables associated with respective ones of the processing nodes to determine which of the processing nodes is nearer to the device; and
   selecting a specific one of the processing nodes which is nearer to the device as the near processing node.

2. The method of claim 1, wherein the determining a near memory associated with the near processing node comprises:
   accessing a memory routing table associated with the near processing node; and
   selecting from the memory routing table an address range corresponding to memory locations within the near memory.

3. The method of claim 1, wherein the allocating a portion of the near memory to the device comprises:
   accessing a memory routing table in the near processing node; and
   locking an address range within the near memory associated with the near processing node for use by the device.

4. The method of claim 1, wherein the determining a near memory associated with the near processing node comprises:
   accessing a memory routing table in the near processing node;
   selecting a memory address range which addresses memory locations locally associated with the near processing node; and
   determining the near memory from the memory locations addressed by addresses within the memory address range.

5. The method of claim 4, wherein the allocating a portion of the near memory to the device comprises:

locking the address range within the near memory for use by the device.

6. The method of claim 1, wherein the allocating a portion of the near memory to the device comprises:
accessing a memory routing table in the near processing node; and
locking an address range within the near memory.

7. The method of claim 1 wherein determining a near processing node to the device further comprises determining a location of each processing node in relation to a bridge circuit.

8. The method of claim 1 wherein a device driver associated with the device is utilized to determine the near processing node.

9. An apparatus comprising:
at least one computer readable storage medium; and
near memory selector code encoded on the at least one computer readable storage medium, the near memory selector code including instructions for determining a near processing node which corresponds to a data path between a device and the near processing node which is shorter than another data path between the device and another processing node, and instructions for allocating memory locations in a near memory which is locally coupled to the near processing node, wherein each of the near processing node and the another processing node locally store associated topology information that is used to determine locations of the near processing node and the another processing node with respect to the device.

10. The apparatus of claim 9 further comprising:
a plurality of processing nodes including the near processing node; and
a plurality of memories including the near memory, each of the plurality of memories being locally coupled to one of the plurality of processing nodes and remotely accessible by others of the processing nodes, the near memory being locally coupled to the near processing node.

11. The apparatus of claim 10 further comprising:
the device coupled to at least one of the processing nodes, wherein the near memory selector code is comprised within a device driver corresponding to the device.

12. The apparatus of claim 11 wherein the device is an accelerated graphics port (AGP) controller, and the near memory selector code is comprised within an AGP driver.

13. The apparatus of claim 10 further comprising:
a SCSI device coupled to at least one of the processing nodes, wherein the near memory selector code is comprised within a SCSI device driver.

14. The apparatus of claim 10 wherein:
each of the processing nodes comprises a processor core; and
at least one of the processing nodes comprises an AGP controller, the AGP controller corresponding to an AGP driver including the near memory selector code.

15. The apparatus of claim 9 wherein the near memory selector code is executable to determine the near processing node based on a location of each processing node to a bridge circuit.

16. A near memory allocation computer program product, stored on at least one computer readable storage media, for configuring memory in an information processing system including a plurality of processing nodes, a plurality of memories associated with the processing nodes, and a device, the product comprising:
instructions for determining a near processing node to the device, wherein the
instructions for determining the near processing node to the device include,
instructions for accessing respective routing tables associated with respective ones of the processing nodes, the respective routing tables located in respective ones of the processing nodes,
instructions for processing information from the routing tables to determine which one of the processing nodes is nearer to the device; and
instructions for selecting the processing node which is nearer to the device as the near processing node;
instructions for determining a near memory associated with the near processing node; and
instructions for allocating a portion of the near memory to the device.

17. The computer program product of claim 16, wherein the instructions for determining a near memory associated with the near processing node comprise:
instructions for accessing a memory routing table associated with the near processing node; and
instructions for selecting from the memory routing table an address range corresponding to memory locations within the near memory.

18. The computer program product of claim 17, wherein the instructions for allocating a portion of the near memory to the device comprise:
instructions for accessing the memory routing table; and
instructions for locking the selected address range for use by the device.

19. The computer program product of claim 16, wherein the instructions for allocating a portion of the near memory to the device comprise:
instructions for accessing a memory routing table in the near processing node; and
instructions for locking an address range within the near memory for use by the device.

20. The computer program product of claim 16, wherein the instructions for determining a near memory associated with the near processing node comprise:
instructions for accessing a memory routing table in the near processing node;
instructions for selecting a memory address range which addresses memory locations locally associated with the near processing node; and
instructions for determining the near memory from the memory locations addressed by addresses within the memory address range.

21. The computer program product of claim 20, wherein the instructions for allocating a portion of the near memory to the device comprise:
instructions for accessing a memory routing table in the near processing node; and
instructions for locking the address range within the near memory for use by the device.

22. The computer program product of claim 16, wherein the instructions for allocating a portion of the near memory to the device comprise:
instructions for accessing a memory routing table in the near processing node; and
instructions for locking an address range within a memory associated with the near processing node.

23. The computer program product of claim 16 wherein the computer program product is a device driver.

24. The computer program product of claim 16, wherein the instructions for determining the near processing node to the device are included within a device driver associated with the device.

25. A method of near memory allocation for a device in an information processing system including a plurality of processor nodes and a plurality of memories respectively associated with the processor nodes, the method comprising:

accessing respective routing tables in each of the processing nodes;

determining, based on accessing the routing tables in each of the processing nodes, a nearest processing node to a bridge device as a near processing node;

accessing a memory routing table in the near processing node and determining therefrom an address range associated with a near memory associated with the near processing node; and allocating device memory in the near memory within the address range to the device.

* * * * *